United States Patent
Govindayapalli et al.

(10) Patent No.: US 10,270,671 B2
(45) Date of Patent: Apr. 23, 2019

(54) EXTERNAL PROCESS USER INTERFACE ISOLATION AND MONITORING

(71) Applicant: Microsoft Technology Licensing, LLC, Redmond, WA (US)

(72) Inventors: Krishnamohan Govindayapalli, Hyderabad (IN); Sonal Sawhney, Rajasthan (IN); Sidhartha Gundavarapu, Telangana (IN); Sanghamitra Samantaray, Telengana (IN); Dileep Raj Perugu, AndhraPradesh (IN); Vineet Chaudhary, Meerut (IN); Virag Shah, Hyderabad (IN); Devansh Kumar Gupta, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 14/994,297

(22) Filed: Jan. 13, 2016

(65) Prior Publication Data
US 2017/0085443 A1 Mar. 23, 2017

(30) Foreign Application Priority Data
Sep. 22, 2015 (IN) .......................... 5060/CHE/2015

(51) Int. Cl.
*H04L 12/24* (2006.01)
*H04L 12/26* (2006.01)
(Continued)

(52) U.S. Cl.
CPC .............. *H04L 43/04* (2013.01); *G06F 9/451* (2018.02); *G06F 9/452* (2018.02); *G06F 11/0757* (2013.01); *H04L 41/22* (2013.01)

(58) Field of Classification Search
CPC . G06F 3/01; G06F 3/14; G06F 3/0481; G06F 3/1415; G06F 3/1438;
(Continued)

(56) References Cited

U.S. PATENT DOCUMENTS 6,170,019 B1 * 1/2001 Dresel ................. G06F 11/0757
719/330
6,275,953 B1 8/2001 Vahalia et al.
(Continued)

FOREIGN PATENT DOCUMENTS

WO WO 2014/035936 A 3/2014

OTHER PUBLICATIONS

"Application Integration on the User Interface Level: an Ontology-Based Approach", In Journal of Data & Knowledge Engineering, vol. 69, Issue 11, Nov. 2010, pp. 1-18.
(Continued)

*Primary Examiner* — Clayton R Williams
*Assistant Examiner* — Michael Li
(74) *Attorney, Agent, or Firm* — Christopher J. Volkmann; Kelly, Holt & Christenson, PLLC

(57) ABSTRACT

User interfaces for Multiple external processes are hosted in a single user interface (UI) threaded host application. A broker process (or broker window) is created in the hosting application for each external process user interface window. A monitor monitors the state of the hosting application and, if it becomes nonresponsive, identifies each of the external processes that are nonresponsive, and issues a notification to terminate the identified external processes.

20 Claims, 10 Drawing Sheets

(51) Int. Cl.
  *G06F 11/07* (2006.01)
  *G06F 9/451* (2018.01)
(58) Field of Classification Search
  CPC ........ G06F 3/1454; G06F 3/1462; G06F 9/54;
    G06F 9/468; G06F 9/4443; G06F 9/4445;
    G06F 9/45533; G06F 9/5038; G06F
    9/5088; G06F 11/328; G06F 11/0709;
    G06F 11/0757; G06F 15/16; G06F
    15/177; G06F 2209/541; G06F 2209/545;
    G06F 9/451; G06F 11/2294; G06F
    2201/875; G06F 9/452; G09G 5/006;
    G09G 5/14; G09G 2340/0407; H04L
    41/12; H04L 41/22; H04L 41/0816; H04L
    41/5058; H04L 43/04; H04L 63/08; H04L
    63/10; H04L 63/0428; H04L 63/0807;
    H04L 67/02; H04L 67/08; H04L 67/10;
    H04L 67/14; H04L 67/38; H04L 67/42;
    H04L 67/141; H04L 67/303; H04L 69/08;
    H04L 69/32; H04L 69/327; H04L 69/329
  See application file for complete search history.

(56) References Cited

U.S. PATENT DOCUMENTS

| | | | |
|---|---|---|---|
| 6,876,889 B1 | 4/2005 | Lortz et al. | |
| 7,546,606 B2 | 6/2009 | Upton | |
| 7,712,034 B2 | 5/2010 | Gusmorino et al. | |
| 8,335,942 B2 | 12/2012 | Zeigler et al. | |
| 8,635,543 B2 | 1/2014 | Dingle et al. | |
| 8,667,505 B2 | 3/2014 | Woods et al. | |
| 8,713,444 B2 | 4/2014 | Sauve et al. | |
| 9,081,746 B1 * | 7/2015 | Helter | G06F 15/177 |
| 2006/0236328 A1 | 10/2006 | DeWitt | |
| 2007/0174429 A1 * | 7/2007 | Mazzaferri | G06F 3/1415 709/218 |
| 2011/0138295 A1 | 6/2011 | Momchilov et al. | |
| 2011/0208804 A1 * | 8/2011 | Kuzhiyil | G06F 9/5038 709/203 |
| 2011/0276661 A1 * | 11/2011 | Gujarathi | G06F 9/4445 709/219 |
| 2011/0296413 A1 | 12/2011 | Wood et al. | |
| 2012/0216072 A1 * | 8/2012 | Zeigler | G06F 11/0709 714/15 |
| 2012/0324365 A1 * | 12/2012 | Momchilov | G06F 3/14 715/738 |
| 2013/0063479 A1 | 3/2013 | Butlin et al. | |
| 2015/0026777 A1 * | 1/2015 | Bell | H04L 63/10 726/4 |

OTHER PUBLICATIONS

Reis, et al., "Using Processes to Improve the Reliability of Browser-based Applications", In Technical Report UW-CSE, Dec. 1, 2007, pp. 1-13.

"Create a CTI Desktop Manager", Retrieved on: Oct. 13, 2015 Available at: https://msdn.microsoft.com/en-us/library/dn864985.aspx.

"Message Broker Explorer hang/crash with large Broker configuration", Retrieved on: Oct. 13, 2015 Available at: http://www-01.ibm.com/support/docview.wss?uid=swg21577196.

V. Chango, "Hosting WPF UI cross-thread and cross-process", Published on: Oct. 26, 2009 Available at: http://blogs.msdn.com/b/changov/archive/2009/10/26/hosting-wpf-ui-cross-thread-and-cross-process.aspx.

"WebBrowser Class", Retrieved on: Oct. 15, 2015 Available at: https://msdn.microsoft.com/en-us/library/system.windows.controls.webbrowser(v=vs.110).aspx.

"International Preliminary Report on Patentability Issued in PCT Application No. PCT/US2016/051800", dated Sep. 19, 2017, 7 Pages.

International Search Report and Written Opinion for International Patent Application No. PCT/US2016/051800, dated Jan. 5, 2017, date of filing: Sep. 15, 2016, 11 pages.

"Run method on main thread from another thread", retrieved at <https://stackoverflow.com/questions/4892182/run-method-on-main-thread-from-another-thread>, accessed on Jan. 31, 2018, bearing a date of 2011, 3 pages.

"Processes and Threads", Accessed at: https://web.archive.org/web/20150917091014/http://developer.android.com/intl/zh-tw/guide/components/processes-and-threads.html, Accessed on Mar. 7, 2018, Bearing a date in internet archive of Sep. 17, 2015, 5 pages.

* cited by examiner

EXTERNAL PROCESS USER INTERFACE ISOLATION AND MONITORING

CROSS-REFERENCE TO RELATED APPLICATION

The present application claims priority of India patent application Serial No. 5060/CHE/2015, filed Sep. 22, 2015, and published in English the content of which is hereby incorporated by reference in its entirety.

BACKGROUND

There are a wide variety of different types of computing systems. Some computing systems are used by organizations that perform customer service or contact center operations. In such systems, a hosting application shows multi-dimensional information on a single user interface from various external applications (or external processes).

Some such systems provide the ability to configure a single user interface that combines user interfaces from various external applications (or external processes) that can be hosted within the hosting application (or parent) user interface. However, the external applications (or external processes) can crash or otherwise become nonresponsive. Because the hosting application renders different user interfaces from the different processes to create the unified view, and because the hosting application has little or no control over the external applications (or processes), the external applications (or processes) can cause the hosting application, itself, to crash or become nonresponsive. This can essentially block the entire hosting application, since all of the user interfaces are rendered on a single UI thread that belongs to the hosting application.

The discussion above is merely provided for general background information and is not intended to be used as an aid in determining the scope of the claimed subject matter.

SUMMARY

User interfaces for multiple external processes are hosted in a single user interface (UI) threaded host application. A broker process (or broker window) is created in the hosting application for each external process user interface window. A monitor monitors the state of the hosting application and, if it becomes nonresponsive, identifies each of the external processes that are nonresponsive, and issues a notification to terminate the identified external processes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
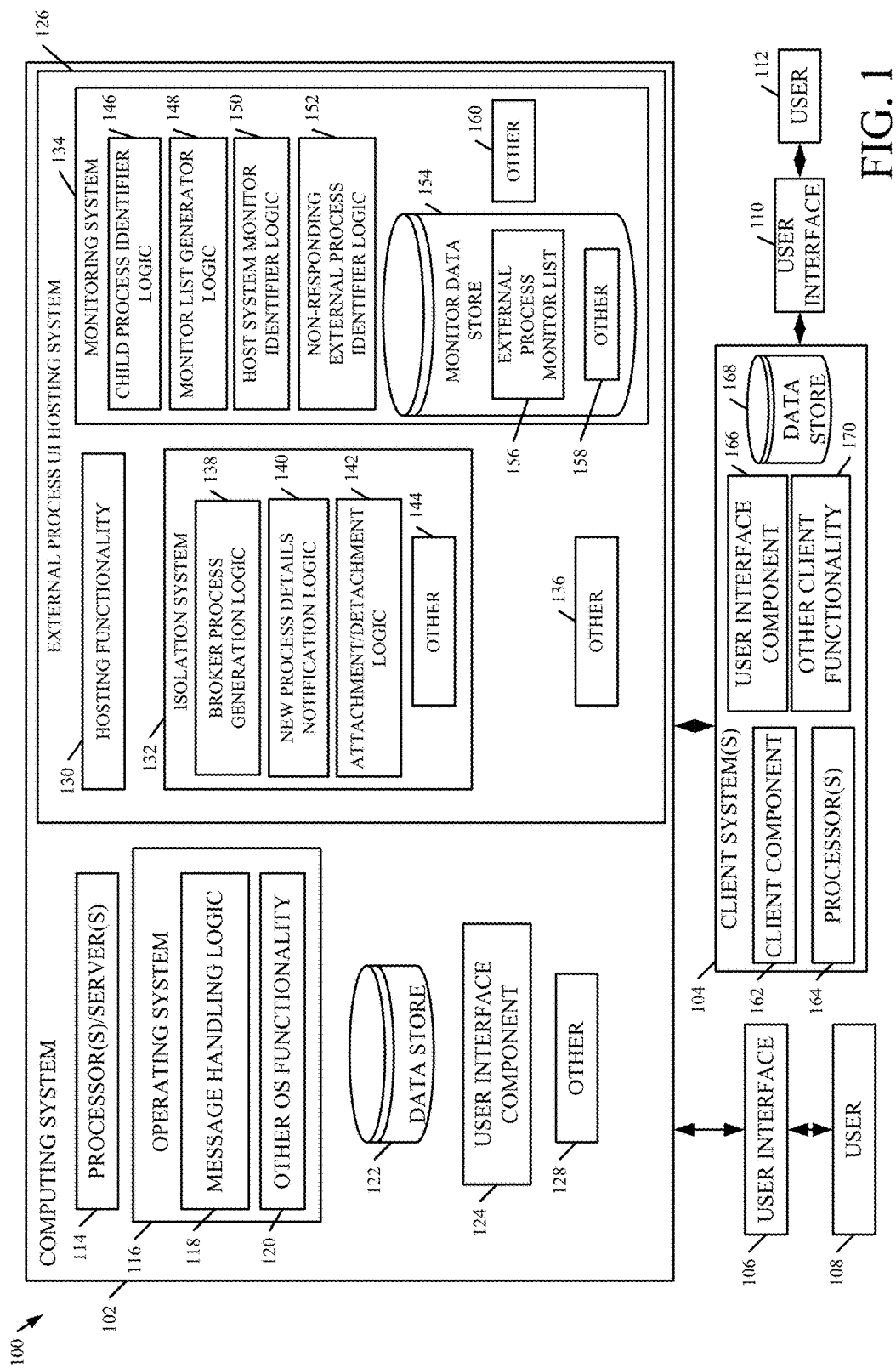
FIG. 1 is a block diagram of one example of a computing system architecture.

FIG. 1 is a block diagram of one example of a computing system architecture 100. Architecture 100 illustratively includes computing system 102 and one or more client systems 104. FIG. 1 shows that, in one example, computing system 102 illustratively generates user interfaces 106 for interaction by user 108. User 108 can illustratively interact with user interfaces 106 to control and manipulate computing system 102. Similarly, client system 104 illustratively generates user interfaces 110 for interaction by user 112. User 112 can illustratively interact with user interfaces 110 in order to control and manipulate client system 104.

In the example shown in FIG. 1, computing system 102 illustratively includes one or more processors or servers 114, operating system 116 (which can include a message handling logic 118 and other operating system functionality 120), data store 122, user interface component 124, external process user interface (UI) hosting system 126, and it can include other items 128. Also, in the example shown in FIG. 1, external process UI hosting system 126 can include a set of hosting functionality 130, isolation system 132, monitoring system 134, and it can include other items 136. FIG. 1 also shows that client system 104 illustratively includes one or more client components 162, one or more processors 164, user interface component 166 and data store 168. It can include other client functionality 170 as well.

Hosting functionality 130 illustratively hosts user interfaces for various external processes (such as processes that can be run on client system 104). Isolation system 132 illustratively isolates those user interfaces, and monitoring system 134 monitors the hosting functionality 130 as well as the external processes, to determine whether they are in a nonresponsive state. This is described in greater detail below.

Isolation system 132, itself, can include broker process generation logic 138, new process details notification logic 140, attachment/detachment logic 142, and it can include other items 144. Monitoring system 134, itself, illustratively includes child process identifier logic 146, monitor list generator logic 148, host system monitor logic 150, non-responding external process identifier logic 152, monitor data store 154 (which can include external process monitor list 156, and other items 158), and it can include other items 160.

Before describing the operation of computing system 102 in more detail, a brief overview will first be provided. External process UI hosting system 126 illustratively hosts the user interface(s) of multiple external processes (which can be run, for instance, on client system 104) inside a tabbed layout in a single user interface threaded application which can be run by hosting functionality 130. In doing so, isolation system 132 illustratively generates a broker process for each external process user interface (or window) that is hosted. Monitoring system 134 monitors the hosting application to identify whether it enters a nonresponsive state. If so, it iterates through all of the hosted, external processes, to identify which of those is in a nonresponsive state. It then identifies, to isolation system 132, which of the external processes are nonresponsive, and isolation system 132 can terminate the broker process that is managing that external process. This type of isolation and monitoring enables the main hosting application run by hosting functionality 130 to maintain access to all of the other external processes, without becoming nonresponsive, based upon one or more of the external processes, themselves, being nonresponsive.

Figure 2:
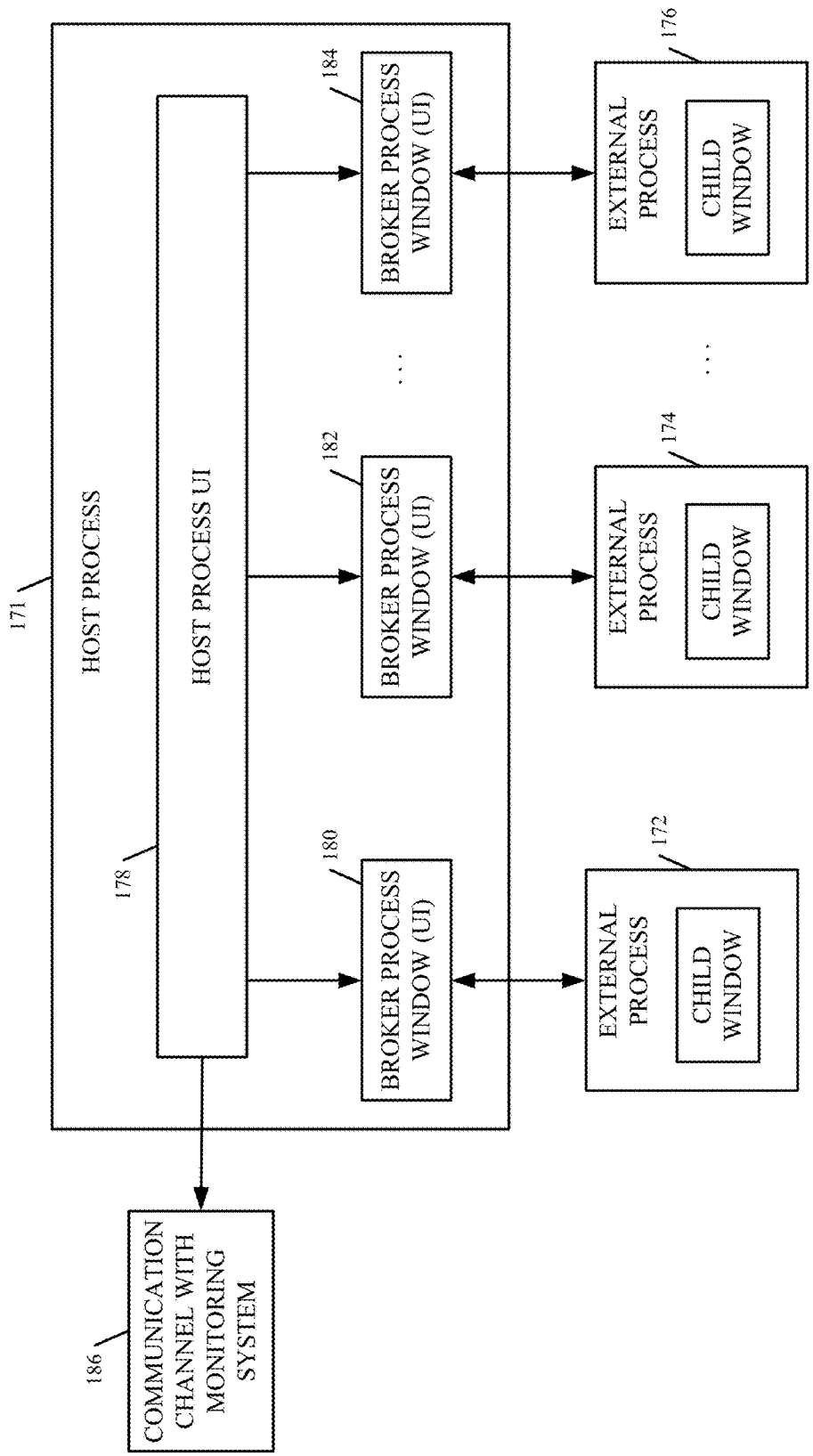
FIG. 2 is a block diagram illustrating arrangement of hierarchically arranged process user interfaces.

FIG. 2 is a block diagram illustrating one example of a main hosting process 171 that can be run by a main hosting application that hosts user interfaces for a set of external processes 172, 174 and 176 (each of which can have its own UI or window). It can be seen that the main hosting process 171 includes a host process user interface 178. It also includes a separate broker process window (or broker process user interface) 180, 182 and 184, corresponding to each of the external processes 172-176. Hosting process 171 is also illustratively coupled to, and managing, the interfaces for a communication channel 186 that provides communication with monitoring system 134 (shown in FIG. 1).

By way of overview, when the host process user interface 178 becomes nonresponsive (as detected by monitoring system 134), then monitoring system 134 illustratively accesses each of the broker process user interfaces (or windows) 180-184 to determine which (if any) external processes 172-176 have become nonresponsive. It can then send a message to message handling component 118 in operating system 116 to indicate that the corresponding broker process window 180-184 should be terminated (or detached) from host process user interface 178. The host process user interface 178 can then terminate the corresponding broker process windows 180-184, while maintaining its connection to the other broker process windows 180-184 (and therefore maintaining accessibility to the other external processes that are still responsive). When the external process that was identified as being in a nonresponsive state is then returned to its responsive state, the broker process window (or a new broker process window) for that external process can be generated and reattached to the host process user interface 178.

Figure 3:
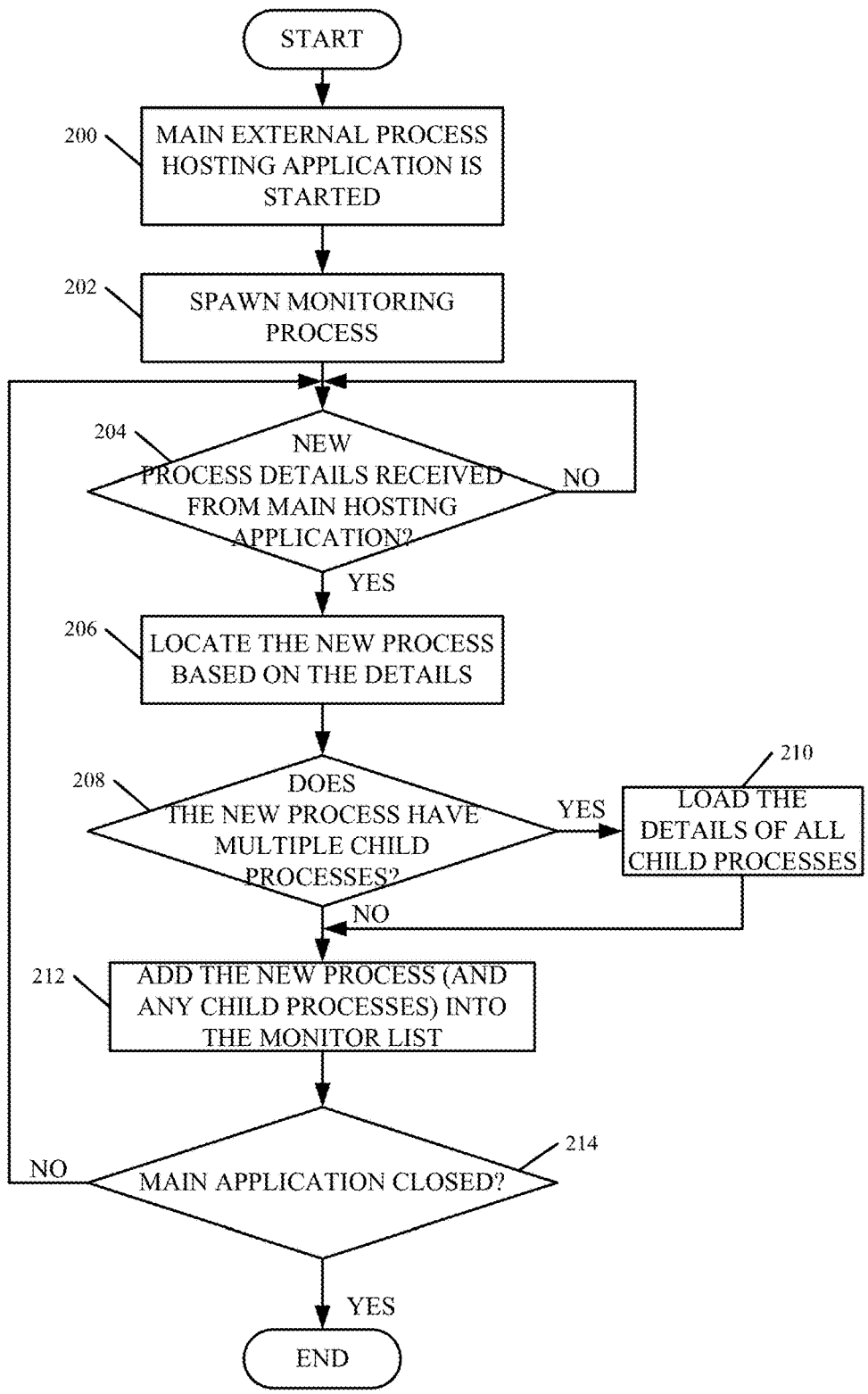
FIG. 3 is a flow diagram illustrating one example of the operation of a monitoring system (shown in FIG. 1) in generating an external process monitor list.

FIG. 3 is a flow diagram illustrating one example of the operation of external UI hosting system 126 in identifying new process user interfaces that it will be hosting, and communicating that information to monitoring system 134 so that monitoring system 134 can enter it in external process monitor list 156. It is first assumed that the main external process hosting application is started. This can be started, for instance, in hosting functionality 130. This is indicated by block 200 in FIG. 3.

When that is detected, the hosting application (or another set of logic or component) spawns an instance of a monitoring process that can be implemented by monitoring system 134. Spawning the monitoring process is indicated by block 202. At some point, the main external process hosting application will begin to host user interfaces for external processes. When it does this, attachment/detachment logic 142 controls broker process generation logic 138 to generate a broker process (which has a broker process window) for the new external process to be hosted. This is so the hosting application 130 can detach itself from the corresponding external process (should it become nonresponsive) by terminating its corresponding broker process. New process details notification logic 140 then notifies monitoring system 134 of the details of the new process, for which a user interface is to be hosted by the main process hosting application. Notifying the monitoring system 134 of the new process details is indicated by block 204 in FIG. 3.

Child process identifier logic 146 then locates the new process, based upon the details that have been provided. This is indicated by block 206. Monitor list generator logic 148 then determines whether the new process has one or more child processes. This is indicated by block 206. If so, then child process identifier logic 146 identifies the details of each of the child processes. This is indicated by block 210.

Monitor list generator logic 148 then adds the new process (and any of its child processes) into the external process monitor list 156. This is indicated by block 212.

This continues, for each new external process that is being hosted by the main external process hosting application. This is indicated by block 214.

Once monitoring system 134 has items in its external process monitor list 156, it can begin monitoring the main external process hosting application, as well as the external processes. Briefly, host system monitor logic 150 monitors the main external process hosting application to determine whether it has become nonresponsive, and non-responding external process identifier logic 152 identifies which, if any, of the external processes have caused the main hosting application to become nonresponsive, so their broker processes can be terminated. This is now described in greater detail below with respect to FIGS. 4 and 5.

Figure 4:
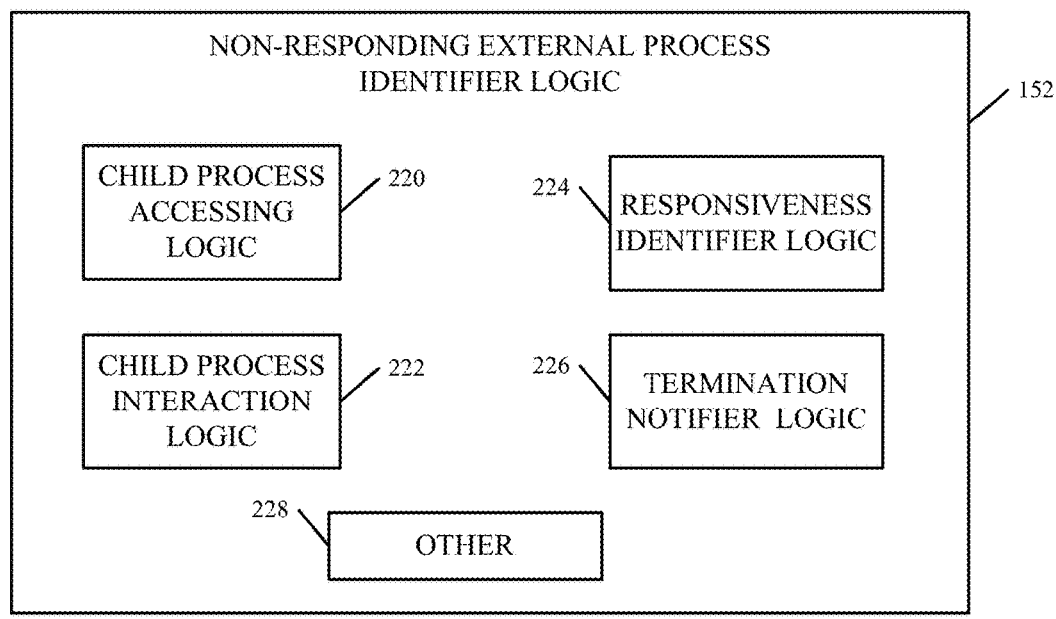
FIG. 4 is a block diagram showing one example of a nonresponding external process identifier component, in more detail.

FIG. 4 is a block diagram showing one example of non-responding external process identifier logic 152 in more detail. In the example shown in FIG. 4, logic 152 includes child process accessing logic 220, child process iteration logic 222, responsiveness identifier logic 224, termination notifier logic 226, and it can include other items 228. By way of overview, child process accessing logic 220 identifies various child processes that are having their UIs hosted by the main hosting application. Child process iteration logic 222 iterates through each of the child process UIs, and responsiveness identifier logic 224 identifies which of them, if any, have become nonresponsive. Termination notifier logic 226 then sends a notification indicating that the broker processes for the nonresponsive external process UIs should be terminated.

Figure 5:
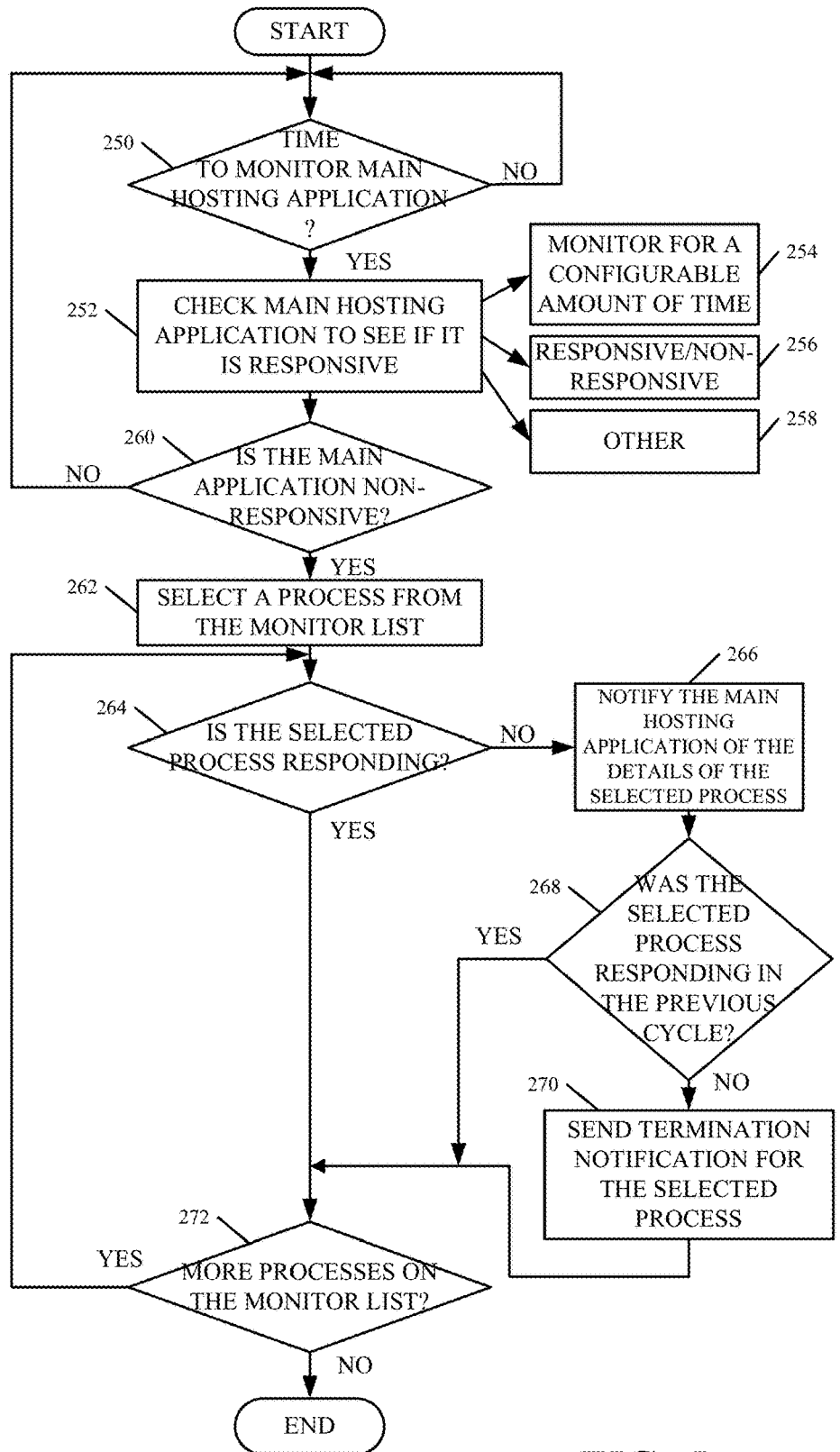
FIG. 5 is a flow diagram illustrating one example of the operation of a monitoring system (shown in FIG. 1) in identifying child processes that are in a non-responsive state.

FIG. 5 is a flow diagram illustrating one example of the operation of monitoring system 134, in identifying nonresponsive processes, in more detail.

At some point, host system monitoring logic 150 determines whether it is time to monitor the main hosting application to determine whether it has become nonresponsive. This can be done in a wide variety of different ways. In one example, host system monitor logic 150 continuously polls the main hosting application to ensure that it is still responsive. In another example, it can poll the main hosting application intermittently, periodically, or based on other triggering criteria. All of these are contemplated herein. Determining that it is time to monitor the main hosting application is indicated by block 250 in FIG. 5.

When it is time to monitor the main hosting application, host system monitor logic 150 checks to determine whether it is responsive. This is indicated by block 252. For instance, it can monitor the activity of the main hosting application for a configurable amount of time. This is indicated by block 254. It can send various different types of messages to the hosting application to determine whether it is responsive or nonresponsive. This is indicated by block 256. It can identify the state of responsiveness of the main hosting application in other ways as well, and this is indicated by block 258.

If host system monitoring logic 150 determines that the main hosting application is nonresponsive (as indicated by block 260), then non-responding external process identifier logic 152 begins to determine which, if any, of the processes in the external process monitor list 156 have become nonresponsive. Thus, child process accessing logic 220 first selects a process from the monitor list, and responsiveness identifier logic 224 determines whether the selected process is responding. This is indicated by blocks 262 and 264 in FIG. 5.

If the selected process is not responding, then responsiveness identifier logic 224 notifies the main hosting application of the details of the selected process, and also indicating that it is nonresponsive. This is indicated by block 266. This can allow the main hosting application to perform certain activities. For instance, it may wish to log the state of the external process, or various details about the external process, before the external process is terminated.

In one example, responsiveness identifier logic 224 can also determine whether the selected process responded during the previous monitoring cycle. This is indicated by block 268. If so, it may wait to send (or delay in sending) a termination notification for the selected process, allowing the selected process to recover, if possible.

However, if the selected process has not been responsive for multiple cycles, then termination notifier logic 226 illustratively sends message handling logic 118 in operating system 116 a message or notification that the broker process corresponding to the selected, nonresponsive process, should be terminated. This is indicated by block 270. The message handling system 118 can communicate this message to the main hosting application which, at its discretion, can then terminate the broker process for the nonresponsive external process.

Child process iteration logic 222 iterates through all of the external processes in the external process monitor list 156, until all of them have been checked for responsiveness. This is indicated by block 272 in FIG. 5.

It can thus be seen that the external processes that have user interfaces hosted by the main hosting application are isolated. This is done by generating a broker process corresponding to each of the external processes. Because the broker process is generated within the main hosting application, the main hosting application can detach itself from any external processes that become nonresponsive. However, it can maintain an attachment with other external processes that are still responding.

Similarly, the monitoring system first monitors the main hosting application to identify when it has become nonresponsive, itself. When this happens, the monitoring system iterates through all of the external processes that have user interfaces hosted by the main hosting application, and identifies which of those, if any, have become nonresponsive. It can then issue a notification to terminate the corresponding broker processes so that the main hosting application does not stay in a nonresponsive state, but instead can continue operating with respect to the other external processes.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
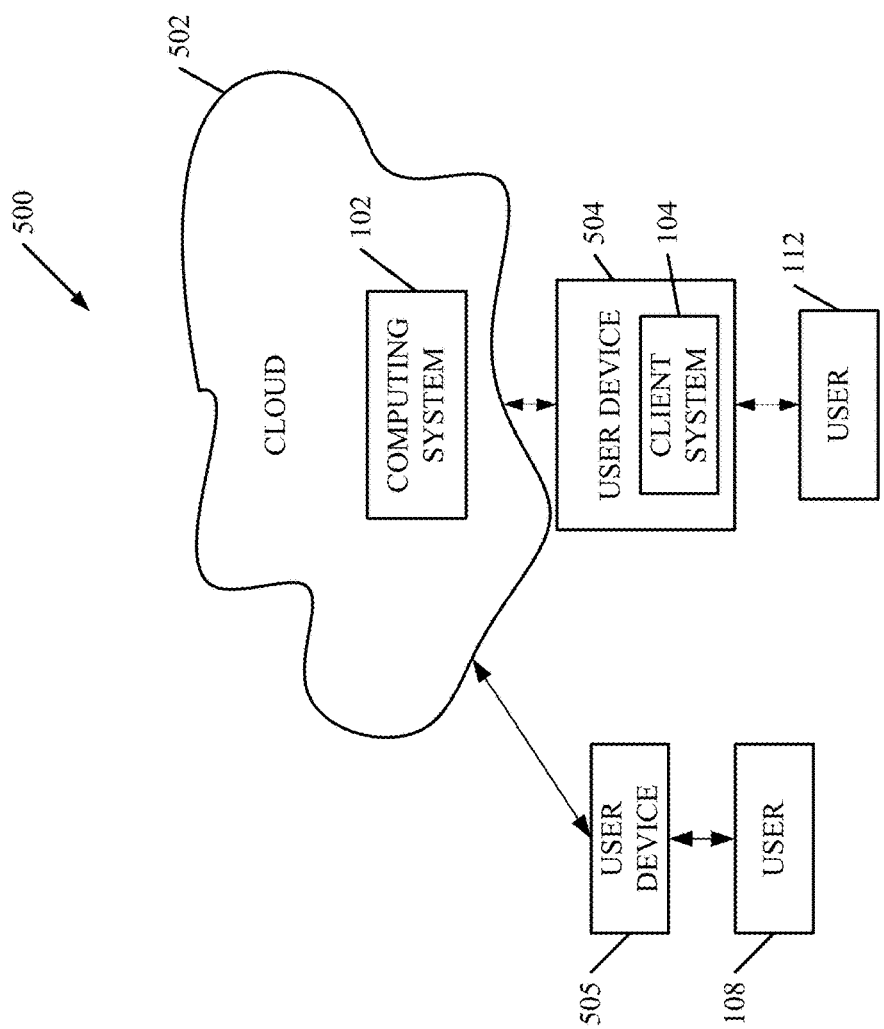
FIG. 6 shows one example of the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, users 108 and 112 can use user devices 504 and 505 to access those systems through cloud 502.

Regardless of where they are located, they can be accessed directly by devices 504 and 505, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
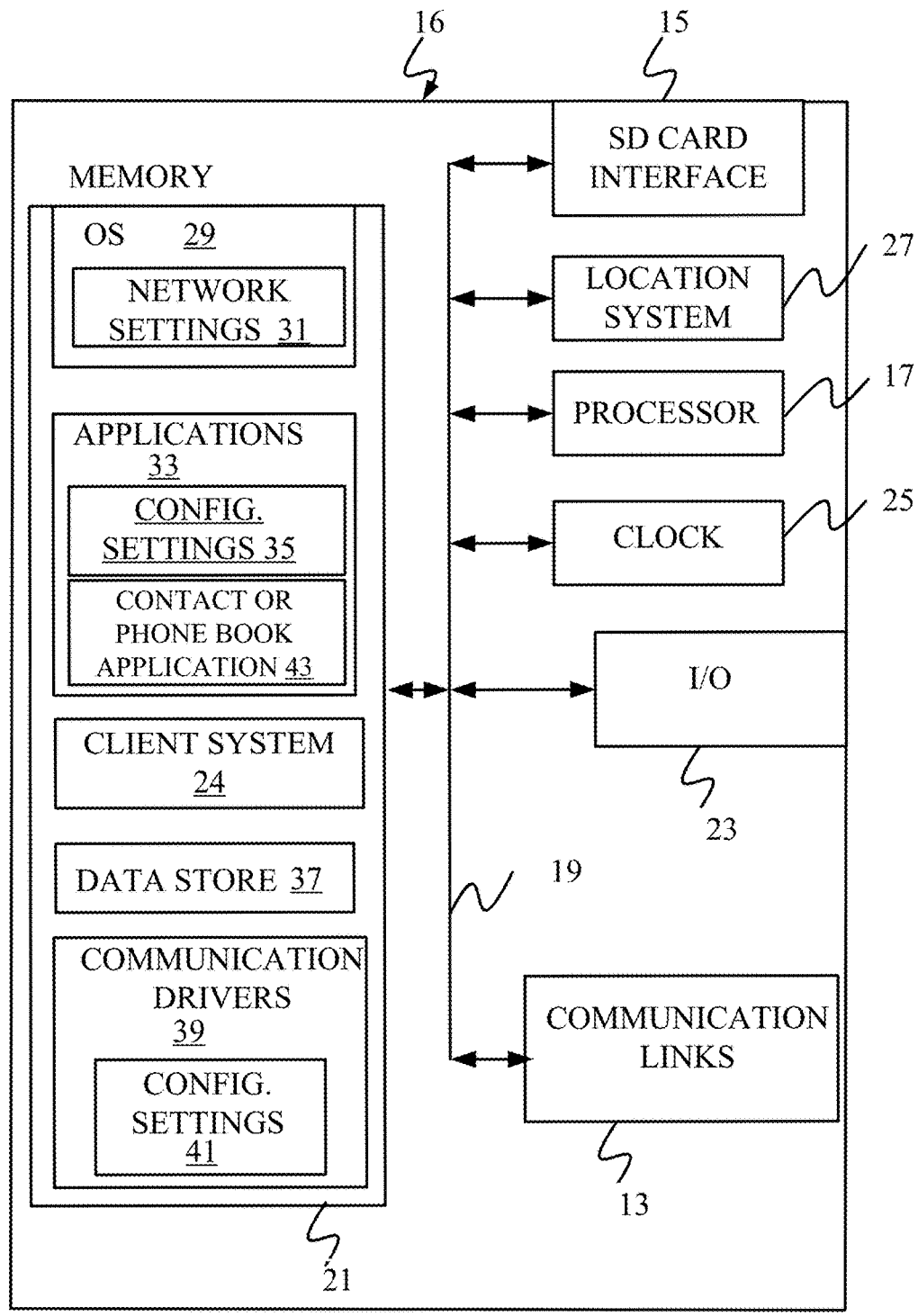
FIGS. 7-9 show various examples of mobile devices.
Figure 8:
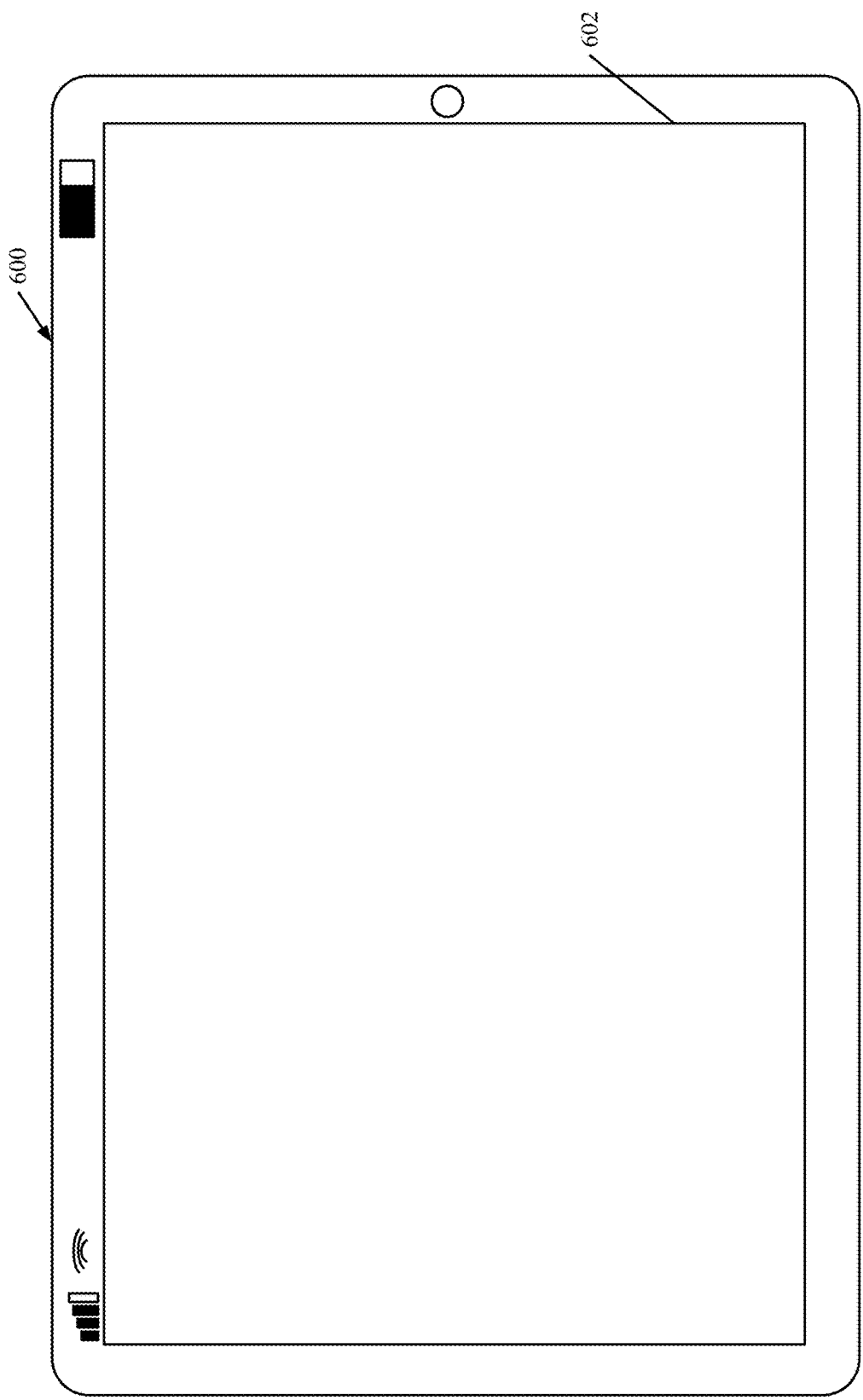
Figure 9:
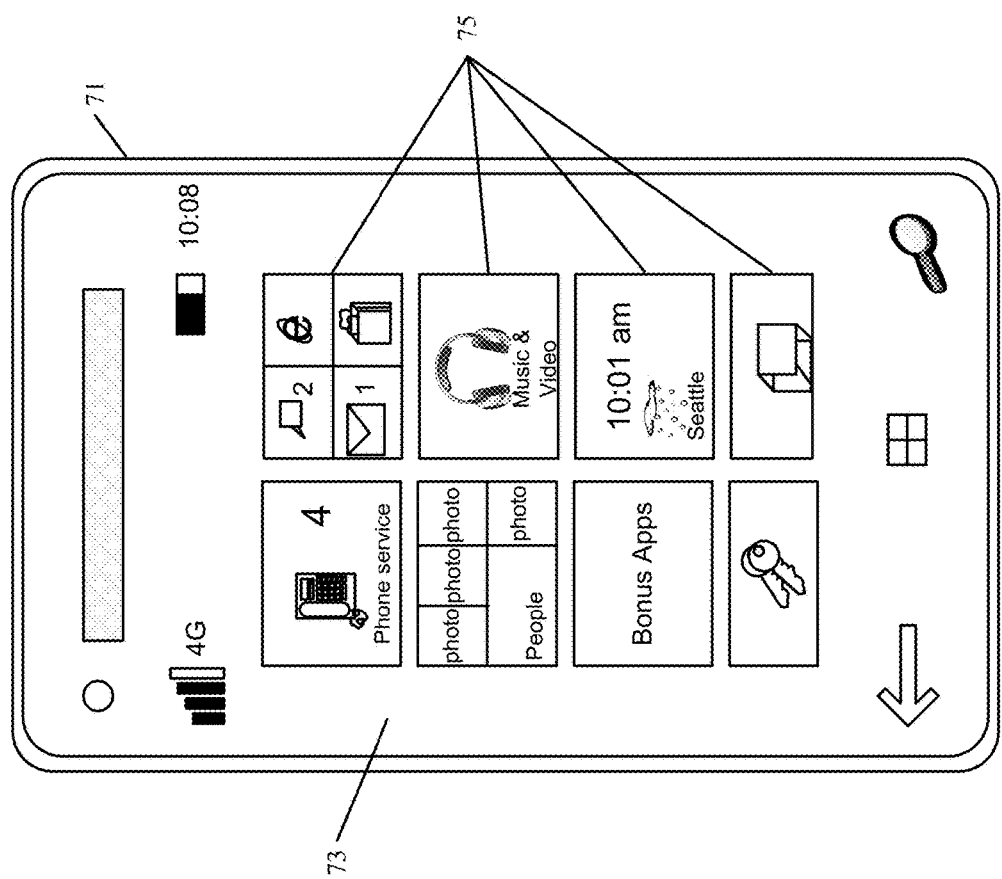

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of client system 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
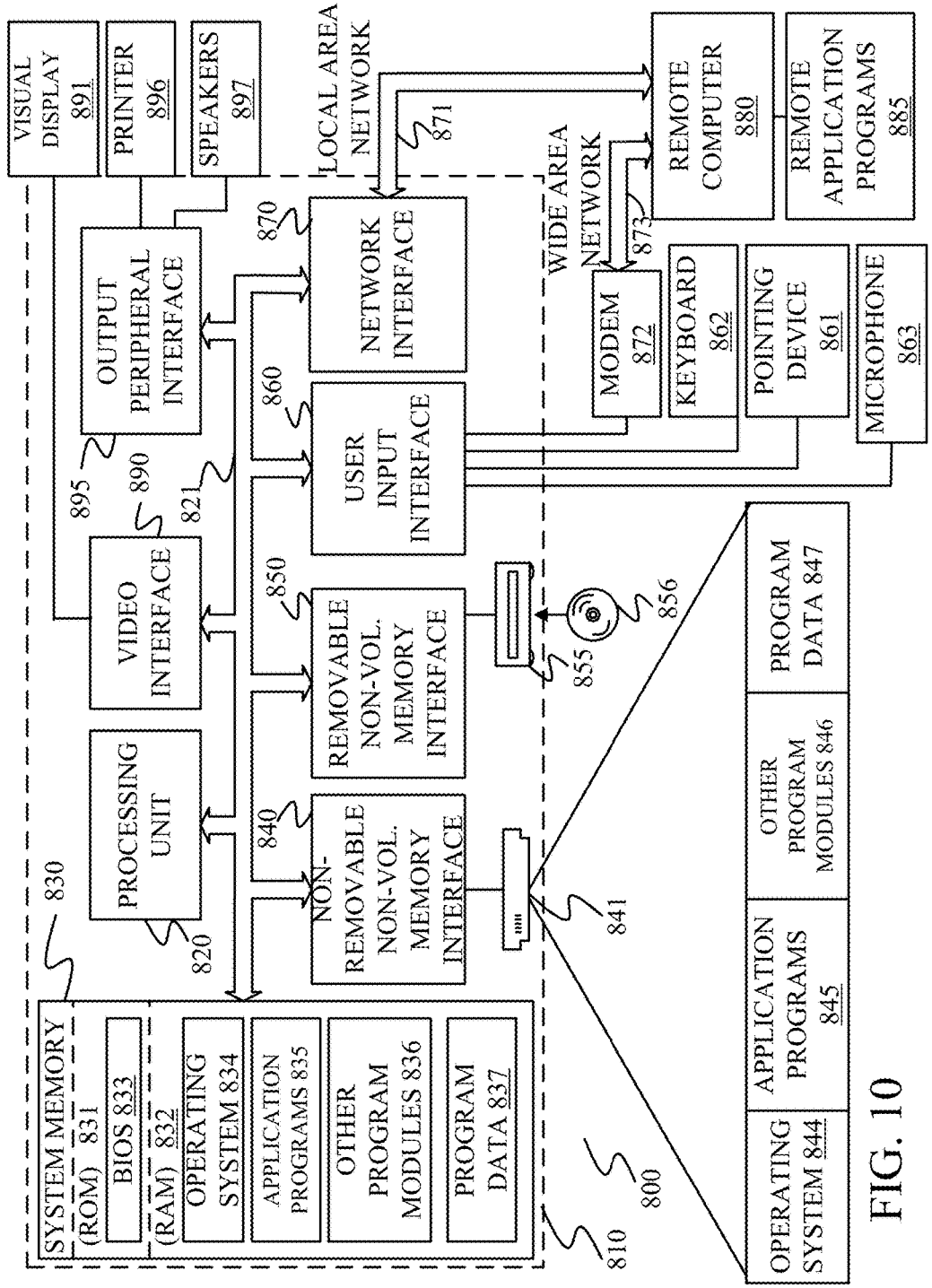
FIG. 10 is a block diagram of one example of a computing environment that can be used in the architecture shown in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a set of hosting functionality that runs a hosting application that hosts user interfaces for a plurality of external processes that are external to the computing system;

an isolation system that generates, for each external process, a corresponding broker process that hosts a user interface for the corresponding external process and that is controlled by the hosting application; and a monitoring system that monitors a responsiveness of the hosting application and each of the external processes and generates a termination signal to terminate broker processes for non-responsive external processes.

Example 2 is the computing system of any or all previous examples wherein the isolation system comprises:

broker process generation logic that generates a first broker process for a corresponding first external process; and new process details notification logic that notifies the monitoring system of identifying information identifying the first external process.

Example 3 is the computing system of any or all previous examples wherein the monitoring system comprises:

monitor list generator logic that adds a first external process identifier that identifies the first external process to a process monitor list based on the identifying information.

Example 4 is the computing system of any or all previous examples wherein the monitoring system comprises:

child process identifier logic that accesses a representation of the first external process and identifies any child processes in the first external process and accesses identifying information identifying the child processes, the monitor list generator logic adding child process identifiers for each identified child process to the process monitor list.

Example 5 is the computing system of any or all previous examples wherein the monitoring system comprises:

host system monitor logic that monitors the responsiveness of the hosting application and generates a non-responsive output indicative of the hosting application being in a non-responsive state.

Example 6 is the computing system of any or all previous examples wherein the monitoring system comprises:

non-responding external process identifier logic that receives the non-responsive output indicating that the hosting application is in a non-responsive state and determines a responsiveness of one or more of the external processes identified on the process monitor list.

Example 7 is the computing system of any or all previous examples wherein the non-responding external process identifier logic comprises:

responsiveness identifier logic that selects an external process from the process monitor list, corresponding to the non-responsive hosting application, and identifies whether the selected external process is responsive and, if not, generates an output indicating that the selected external process is in a non-responsive state.

Example 8 is the computing system of any or all previous examples wherein the non-responding external process identifier logic comprises:

termination notifier logic that notifies the hosting application that the selected external process in the non-responsive state.

Example 9 is the computing system of any or all previous examples wherein the hosting application generates the termination signal terminating the broker process corresponding to the selected external process, in response to the selected external process being in the non-responsive state.

Example 10 is a computer implemented method, comprising:

running a hosting application that hosts user interfaces for a plurality of external processes that are external to the hosting application;

generating, for each external process, a corresponding broker process that hosts a user interface for the corresponding external process and that is controlled by the hosting application;

monitoring a responsiveness of the hosting application and each of the external processes; and generating a termination signal to terminate broker processes for non-responsive external processes.

Example 11 is the computer implemented method of any or all previous examples wherein generating a corresponding broker process comprises:

generating a first broker process for a corresponding first external process; and generating a notification including identifying information identifying the first external process.

Example 12 is the computer implemented method of any or all previous examples wherein monitoring comprises:

adding a first external process identifier that identifies the first external process to a process monitor list based on the identifying information.

Example 13 is the computer implemented method of any or all previous examples wherein monitoring comprises:

accessing a representation of the first external process;

identifying any child processes in the first external process;

accessing identifying information identifying the child processes; and adding child process identifiers for each identified child process to the process monitor list.

Example 14 is the computer implemented method of any or all previous examples wherein monitoring comprises:

monitoring the responsiveness of the hosting application; and generating a non-responsive output indicative of the hosting application being in a non-responsive state.

Example 15 is the computer implemented method of any or all previous examples wherein monitoring comprises:

receiving the non-responsive output indicating that the hosting application is in a non-responsive state; and determining a responsiveness of one or more of the external processes identified on the process monitor list.

Example 16 is the computer implemented method of any or all previous examples wherein determining a responsiveness of one or more of the external processes comprises:

selecting an external process from the process monitor list, corresponding to the non-responsive hosting application;

identifying whether the selected external process is responsive; and if not, generating an output indicating that the selected external process is in a non-responsive state.

Example 17 is the computer implemented method of any or all previous examples and further comprising:

generating, with the hosting application a termination signal terminating the broker process corresponding to the selected external process, in response to the selected external process being in the non-responsive state.

Example 18 is a computing system, comprising:

a set of hosting functionality that runs a hosting application that hosts user interfaces for a plurality of external processes that are external to the computing system;

broker process generation logic that generates a first broker process for a corresponding first external process, the first broker process hosting a user interface for the corresponding first external process and being controlled by the hosting application;

new process details notification logic that generates a notification with identifying information identifying the first external process; and a monitoring system that monitors a responsiveness of the hosting application and the first external process and generates a termination signal to terminate the first broker process when the corresponding first external process is non-responsive.

Example 19 is the computing system of any or all previous examples wherein the monitoring system comprises:

monitor list generator logic that adds a first external process identifier that identifies the first external process to a process monitor list based on the identifying information.

Example 20 is the computing system of any or all previous examples wherein the monitoring system comprises:

host system monitor logic that monitors the responsiveness of the hosting application and generates a non-responsive output indicative of the hosting application being in a non-responsive state; and responsiveness identifier logic that receives the non-responsive output indicating that the hosting application is in a non-responsive state, that selects an external process from the process monitor list, corresponding to the non-responsive hosting application, that identifies whether the selected external process is responsive and, if not, generates an output indicating that the selected external process is in a non-responsive state.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, provide:
hosting functionality configured to run a hosting application that hosts user interfaces for a plurality of external processes that are external to the computing system;
an isolation system configured to:
generate a first broker process that:
is controlled by the hosting application,
corresponds to a first one of the external processes, and
manages hosting of the user interface for the first external process;
generate a second broker process that:
is controlled by the hosting application,
corresponds to a second one of the external processes, and
manages hosting of the user interface for the second external process;
generate process identifying information that identifies the first and second external processes; and
a monitoring system configured to:
generate a process monitor list based on the process identifying information;
monitor the responsiveness of the hosting application;
generate a non-responsive indicator that indicates the hosting application being in a non-responsive state;
based on the non-responsive indicator, determine a responsiveness of each of the first and second external processes identified on the process monitor list; and
based on the determined responsiveness,
determine that the first external processes is non-responsive; and
generate a termination signal to terminate the first broker process that corresponds to the first external process that is non-responsive while the second broker process maintains the hosting of the user interface for the second external process.

2. The computing system of claim 1 wherein the isolation system comprises:
broker process generation logic configured to generate the first broker process for the first external process and the second broker process for the second external process; and
new process details notification logic configured to notify the monitoring system of the process identifying information that identifies the first and second external processes.

3. The computing system of claim 2 wherein the monitoring system comprises:
monitor list generator logic configured to add, to the process monitor list, a first external process identifier that identifies the first external process and a second external process identifier that identifies the second external process.

4. The computing system of claim 3 wherein the monitoring system comprises:
child process identifier logic configured to:
access a representation of the first external process;
identify any child processes in the first external process; and
access identifying information identifying the child processes,
the monitor list generator logic configured to add child process identifiers for each identified child process to the process monitor list.

5. The computing system of claim 3 wherein the monitoring system comprises:
host system monitor logic configured to monitor the responsiveness of the hosting application and generate the non-responsive indicator indicative of the hosting application being in a non-responsive state.

6. The computing system of claim 5 wherein the monitoring system comprises:
non-responding external process identifier logic configured to receive the non-responsive indicator indicating that the hosting application is in a non-responsive state and determine a responsiveness of each of the first and second external processes identified on the process monitor list.

7. The computing system of claim 6 wherein the non-responding external process identifier logic comprises:
responsiveness identifier logic configured to:
select the first external process from the process monitor list, corresponding to the non-responsive hosting application;
identify whether the first external process is responsive; and
if the first external process is not responsive, generate an output indicating that the first external process is in a non-responsive state.

8. The computing system of claim 7 wherein the non-responding external process identifier logic comprises:
termination notifier logic configured to notify the hosting application that the first external process is in the non-responsive state.

9. The computing system of claim 8 wherein the hosting application is configured to:
in response to the first external process being in the non-responsive state, generate the termination signal terminating the first broker process corresponding to the first external process.

10. A computer implemented method, comprising:
running a hosting application that hosts user interfaces for a plurality of external processes that are external to the hosting application;
generating, for a first one of the external processes, a first broker process that:
is controlled by the hosting application, and
manages hosting of the user interface for the first external process;
generating, for a second one of the external processes, a second broker process that:
is controlled by the hosting application, and
manages hosting of the user interface for the second external process;
generating process identifying information that identifies the first and second external processes;
generating a process monitor list based on the process identifying information;
monitoring the responsiveness of the hosting application;
generating a non-responsive indicator that indicates the hosting application being in a non-responsive state;
based on the non-responsive indicator, determining a responsiveness of each of the first and second external processes identified on the process monitor list;
based on the determined responsiveness,
determining that the first external process is in a non-responsive state; and
generating a termination signal to terminate the first broker process that corresponds to the first external process that is in the non-responsive state while the second broker process maintains the hosting of the user interface for the second external process.

11. The computer implemented method of claim 10 and further comprising:
generating a notification that includes the process identifying information that identifies the first and second external processes.

12. The computer implemented method of claim 11 wherein monitoring comprises:
adding a first external process identifier, that identifies the first external process, to the process monitor list based on the process identifying information.

13. The computer implemented method of claim 12 wherein monitoring comprises:
accessing a representation of the first external process;
identifying any child processes in the first external process;
accessing identifying information identifying the child processes; and
adding child process identifiers for each identified child process to the process monitor list.

14. The computer implemented method of claim 10 wherein determining a responsiveness of each of the external processes comprises:
selecting the first external process from the process monitor list, corresponding to the non-responsive hosting application;
identifying whether the first external process is responsive; and
if not, generating an output indicating that the first external process is in a non-responsive state.

15. The computer implemented method of claim 14 and further comprising:
generating, with the hosting application a termination signal terminating the broker process corresponding to the first external process, in response to the first external process being in the non-responsive state.

16. A computing system, comprising:
a processor; and
memory storing instructions executable by the processor, wherein the instructions, when executed, configure the computing system to:
run a hosting application that hosts user interfaces for a plurality of external processes that are external to the computing system;
generate a first broker process that:
is controlled by the hosting application,
corresponds to a first one of the external processes, and
manages hosting of the user interface for the first external process;
generate a second broker process that:
is controlled by the hosting application,
corresponds to a second one of the external processes, and
manages hosting of the user interface for the second external process;
monitor a responsiveness of the hosting application;
generate a non-responsive indicator that indicates the hosting application being in a non-responsive state;
based on the non-responsive indicator, determine a responsiveness of each of the first and second external processes; and
based on the determined responsiveness,
determine that the first external process is non-responsive; and
generate a termination signal to terminate the first broker process while maintaining hosting of the user interface for the second external process.

17. The computing system of claim 16 wherein the instructions, when executed, configure the computing system to:
add a first external process identifier that identifies the first external process to a process monitor list based on process identifying information.

18. The computing system of claim 17 wherein the instructions, when executed, configure the computing system to:
- select the first external process from the process monitor list, corresponding to the non-responsive hosting application;
- generate an output indicating that the first external process is in a non-responsive state.

19. The computing system of claim 17 wherein the instructions configure the computing system to:
- child process identifier logic configured to:
  - access a representation of the first external process;
  - identify any child processes in the first external process; and
  - access identifying information identifying the child processes,
- add child process identifiers for each identified child process to the process monitor list.

20. The computing system of claim 17 wherein the instructions configure the computing system to:
- in response to the first external process being in the non-responsive state, generate the termination signal terminating the first broker process corresponding to the first external process.

* * * * *